(12) United States Patent
Heidlmayer

(10) Patent No.: US 9,364,999 B2
(45) Date of Patent: Jun. 14, 2016

(54) METHOD FOR PRODUCING A BLANK FROM A FIBER LAYUP

(71) Applicant: GFM-GmbH, Steyr (AT)

(72) Inventor: Franz Heidlmayer, St. Marien (AT)

(73) Assignee: GFM—GmbH, Steyr (AT)

( * ) Notice: Subject to any disclaimer, the term of this patent is extended or adjusted under 35 U.S.C. 154(b) by 267 days.

(21) Appl. No.: 14/255,100

(22) Filed: Apr. 17, 2014

(65) Prior Publication Data

US 2014/0360325 A1     Dec. 11, 2014

(30) Foreign Application Priority Data

Jun. 6, 2013  (EP) ..................................... 13170797

(51) Int. Cl.
*B29C 70/54* (2006.01)
*B26D 3/02* (2006.01)
*B26D 7/08* (2006.01)

(52) U.S. Cl.
CPC ................ *B29C 70/545* (2013.01); *B26D 3/02* (2013.01); *B26D 7/086* (2013.01); *Y10T 83/0524* (2015.04)

(58) Field of Classification Search
CPC ..... B26D 3/02; B29C 70/545; Y10T 83/0524
See application file for complete search history.

(56) References Cited

U.S. PATENT DOCUMENTS

| 7,223,319 | B2 * | 5/2007 | Kurosawa | ......... H01L 21/67132 156/247 |
| 7,823,490 | B2 * | 11/2010 | Evans | ...................... B26D 3/02 83/39 |
| 8,132,487 | B2 | 3/2012 | Evans et al. | |

* cited by examiner

*Primary Examiner* — Sean Michalski
*Assistant Examiner* — Liang Dong
(74) *Attorney, Agent, or Firm* — Collard & Roe, P.C.

(57) ABSTRACT

A method is described for producing a blank (1) from a fiber layup (5) having an edge (3) forming a chamfer (2), wherein the fiber layup (5), which is suctioned onto a cutting support (6) of a cutting table (7), is cut through using a contour cut (17), which extends into the cutting support (6), along the intended contour (4) of the blank (1) and is provided with the chamfer (2) using a chamfer cut (16) running at a flat chamfer angle ($\alpha$) along the intended contour (4). To provide advantageous production conditions, it is proposed that the fiber layup (5) is firstly precut by two cuts, which end above the cutting support (6) and run outside the intended cross section of the edge (3), namely a preliminary cut (10) running transversely to the fiber layup (5) along the contour region and a relief cut (11), which determines a processing allowance (15) to the chamfer (2), and then the chamfer (2) is cut using the chamfer cut (16), which ends outside the intended contour (4) in the fiber layup (5), before the intended contour (4) of the blank (1) is produced by the contour cut (17).

5 Claims, 4 Drawing Sheets

METHOD FOR PRODUCING A BLANK FROM A FIBER LAYUP

CROSS REFERENCE TO RELATED APPLICATIONS

Figure 1:
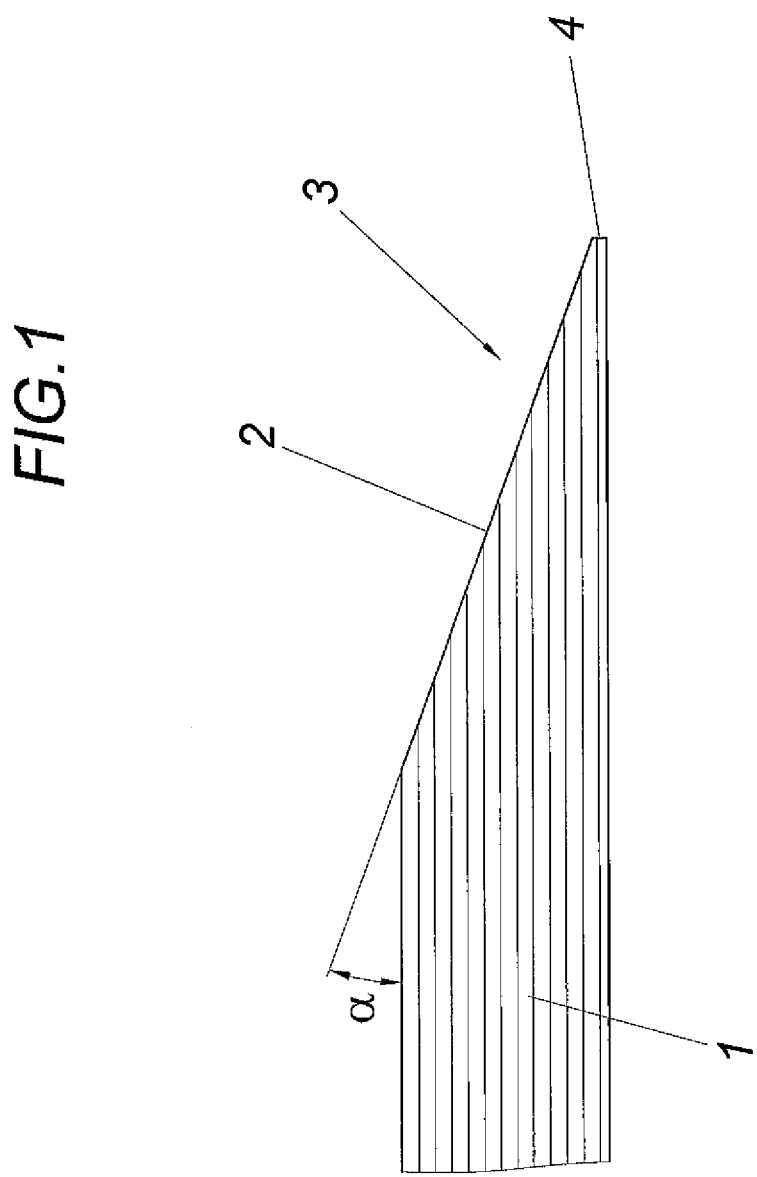

Applicant claims priority under 35 U.S.C. §119 of European Application No. 13170797.8 filed on Jun. 6, 2013, the disclosure of which is incorporated by reference.

The invention relates to a method for producing a blank from a fiber layup having an edge forming a chamfer, wherein the fiber layup, which is suctioned onto a cutting support of a cutting table, is cut through using a contour cut extending into the cutting support along the intended contour of the blank and is provided with the chamfer using a chamfer cut running at a flat chamfer angle along the intended contour.

To be able to connect blanks of layups made of fibers impregnated with plastic to one another in a manner having high tensile strength along the edge upon curing of the plastic, the largest possible edge-side connection surfaces are required, which results in pronounced edge chamfers of the blanks having a flat chamfer angle. The production of such blanks from fiber layups causes difficulties, however, because not only a precise contour profile, but rather also a precisely process chamfer are to be required. This is because if the connection surfaces formed by the cut chamfers do not press against one another over the entire area, plastic regions which are not fiber-reinforced may thus result in the intermediate spaces between the connection surfaces upon curing of the plastic, which can give rise to cracking.

To produce such blanks from a fiber layup impregnated with plastic (U.S. Pat. No. 7,823,490 B2, U.S. Pat. No. 8,132,487 B2), producing the intended contour of the blank not by way of a chamfer cut guided along the intended contour, but rather firstly cutting off the blank from the remaining fiber layup by way of a precise contour cut, which is guided perpendicularly to a table support for the fiber layup along the intended contour and reaches into the cutting support of the cutting table, is known. Only then is the chamfer cut performed to manufacture the blank edge. Although flat cutters having an oscillating drive based on ultrasound are used both for the contour cut and also for the chamfer cut, the fiber layup to be cut off from the blank is displaced along the cutter wedge in particular during the penetration of the cutter for the chamfer cut, with the effect that the occurring forces not only cause a corresponding strain of the cutter, but rather also influence the cutting precision. To counteract the cutter strain and the disadvantages connected thereto, above all with respect to the cutting precision, it is therefore proposed that the additional residual strips of the fiber layup, which are to be cut off by the chamfer cut, be provided with additional, contour-parallel notches extending up to the chamfer, so that the partial strips separated from one another by the notches can be displaced more easily by the chamfer cutter during the chamfer cut. The cutter strain remains substantial, however, because of which the hazard still exists that the chamfer will be scored by the notches as a result of the unavoidable tolerances.

The invention is therefore based on the object of designing a method for producing a blank from a fiber layup having an edge forming a chamfer in such a manner that a high cutting precision can be ensured with comparatively low cutter strain.

Proceeding from a method of the type described at the outset, the invention achieves the stated object in that the fiber layup is firstly precut by two cuts ending above the cutting support and running outside the intended cross section of the edge, namely a a preliminary cut, which runs transversely to the fiber layup along the contour region, and a relief cut, which determines a processing allowance for the chamfer, and then the chamfer is cut using the chamfer cut, which ends outside the intended contour in the fiber layup, before the intended contour of the blank is produced by the contour cut.

Since both the preliminary cut, which runs transversely to the fiber layup in the contour region of the blank, and also the relief cut, which follows the intended profile of the chamfer at a distance, are to be applied outside the intended cross section of the blank edge, a high level of precision does not have to be required for these cuts. They are primarily only used for the purpose of cutting a residual strip, which no longer decisively influences the chamfer cut, out of the fiber layup, so that the following chamfer cut can be carried out precisely and with only comparatively little strain of the chamfer cutter. This is successful because above the intended profile of the chamfer, only a processing allowance remains, while the remaining residual strip is decoupled from the processing allowance by the relief cut. Since, in addition, the fiber layup extends continuously over the intended contour of the blank in the region of the cutting support and is therefore also continuously suctioned against the cutting table, the chamfer cut can be carried out with little strain, which is essentially only dependent on the thickness of the processing allowance. Therefore, only the contour cut is still lacking, which can be performed with high precision because of the remaining fiber bridge, which is also not interrupted by the chamfer cut, between the blank and the remaining residue of the fiber layup and as a result of the mounting for correct cutting, which is dependent thereon, on the cutting support to which partial vacuum is applied.

If the preliminary cut, which runs transversely to the fiber layup, is carried out before the relief cut, which is to be performed at a distance above the chamfer, the residual strip of the fiber layup affected by the relief cut can be displaced more easily by the relief cut cutter, because the connection to the remaining fiber layup is at least substantially detached by the preliminary cut and therefore the mechanical properties of the residual strip separated by the preliminary cut from the remaining fiber layup cannot be influenced by the remaining fiber layup. This is true in particular if the cut surfaces of the preliminary cut and the relief cut intersect. In this case, a fiber bridge, which otherwise remains between the residual strip cut off by the preliminary cut and the relief cut and the remaining fiber layup, is dispensed with, so that this residual strip can also be removed if needed, before the chamfer cut is carried out.

To relieve the cutter for the relief cut during the cut, the fiber layup can be divided before the relief cut in the region of the chamfer by at least one notch running at a distance from the preliminary cut, this notch ending in the processing allowance determined by the relief cut. Due to this additional subdivision of the residual strip of the fiber layup obtained by the preliminary cut, the mechanical properties which are decisive for the cut-related displacement of the residual strip can be additionally improved, which typically only comes into consideration for thicker fiber layups, especially because the processing expenditure increases with additional notches. The chamfer to be cut after the relief cut remains untouched by the notches because of the notches ending in the processing allowance.

The preliminary cut does not have to be guided perpendicularly to the fiber layup. If the residual strip cut off by the preliminary cut is lifted out of the fiber layup before the relief cut, a preliminary cut which runs approximately perpendicularly to the cut surface of the relief cut can provide advantages. However, particularly favorable method conditions result for the processing sequence if the preliminary cut is carried out in a surface corresponding to the cut surface of the contour cut, because then the fiber bridge remaining after the chamfer cut between the blank and the remaining fiber layup is to be cut through by the contour cut, which only deepens the preliminary cut.

Figure 3:
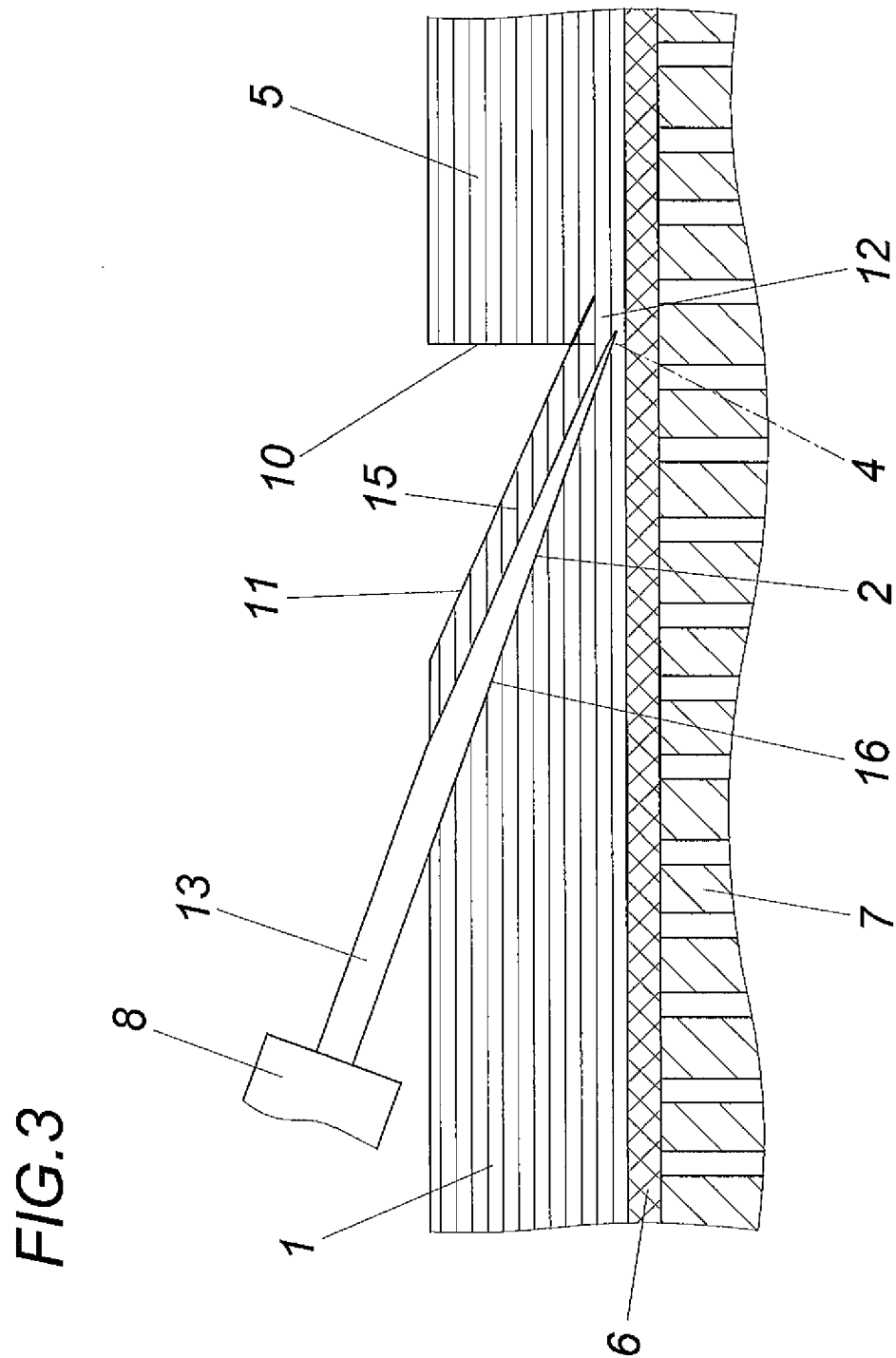
Figure 4:
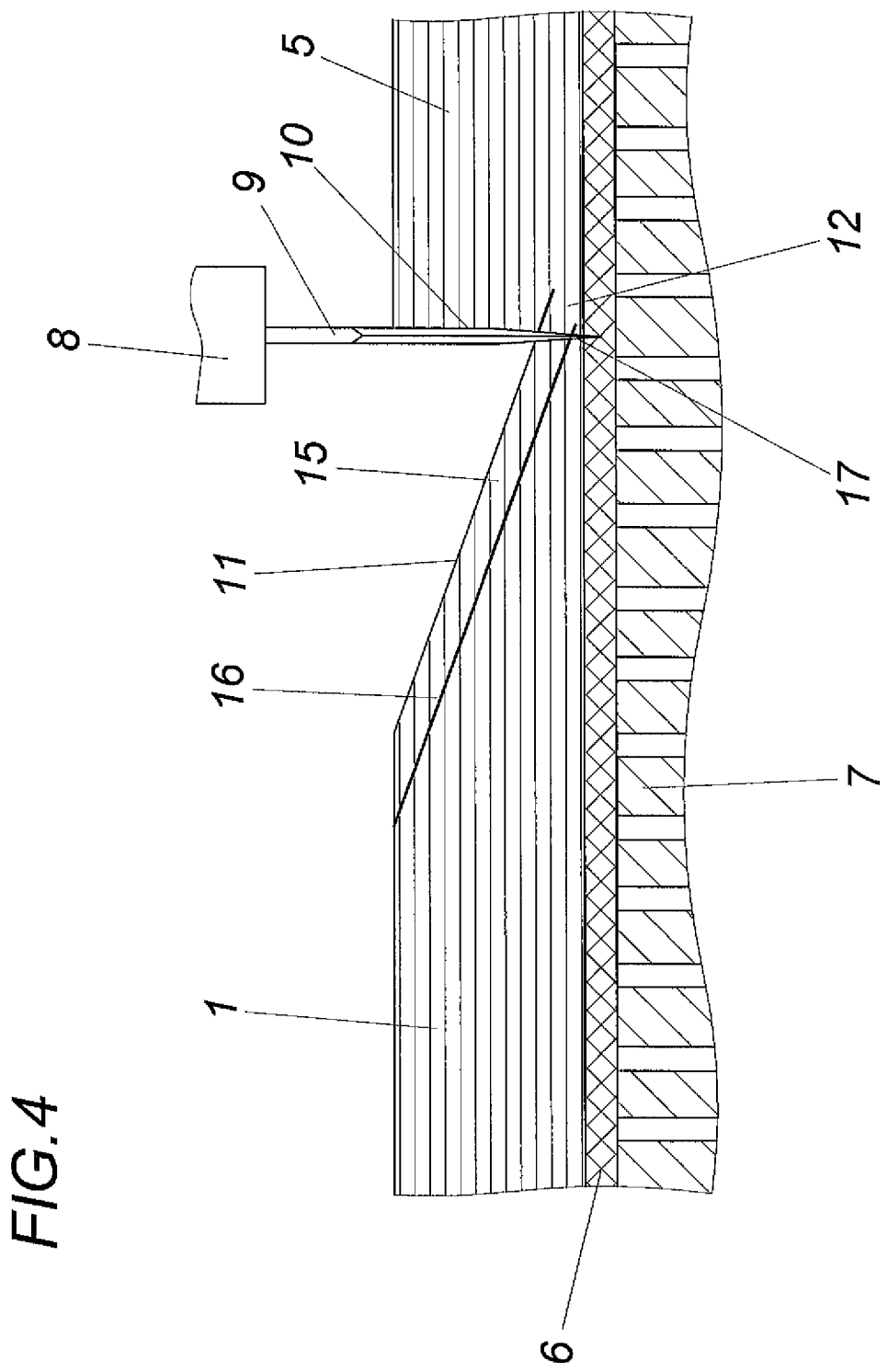

The method according to the invention will be explained in greater detail on the basis of the drawing. In the figures FIG. 1 shows a cross section of a blank, which is produced according to the method according to the invention, from a fiber layup in detail in an edge region and FIGS. 2 to 4 show a fiber layup, which is suctioned onto a cutting table, in different processing steps to produce a blank corresponding to FIG. 1 in a cross section perpendicularly to the cutting direction and therefore to the contour profile.

As can be inferred from FIG. 1, the blank 1, which is to be cut out of a fiber layup, is to have an edge 3, which forms a pronounced chamfer 2, having a flat chamfer angle α of 17° to 25°. The outer intended contour 4 delimiting the chamfer 2 is determined not only by the chamfer 2, but rather by a contour cut running transversely to the blank 1.

Figure 2:
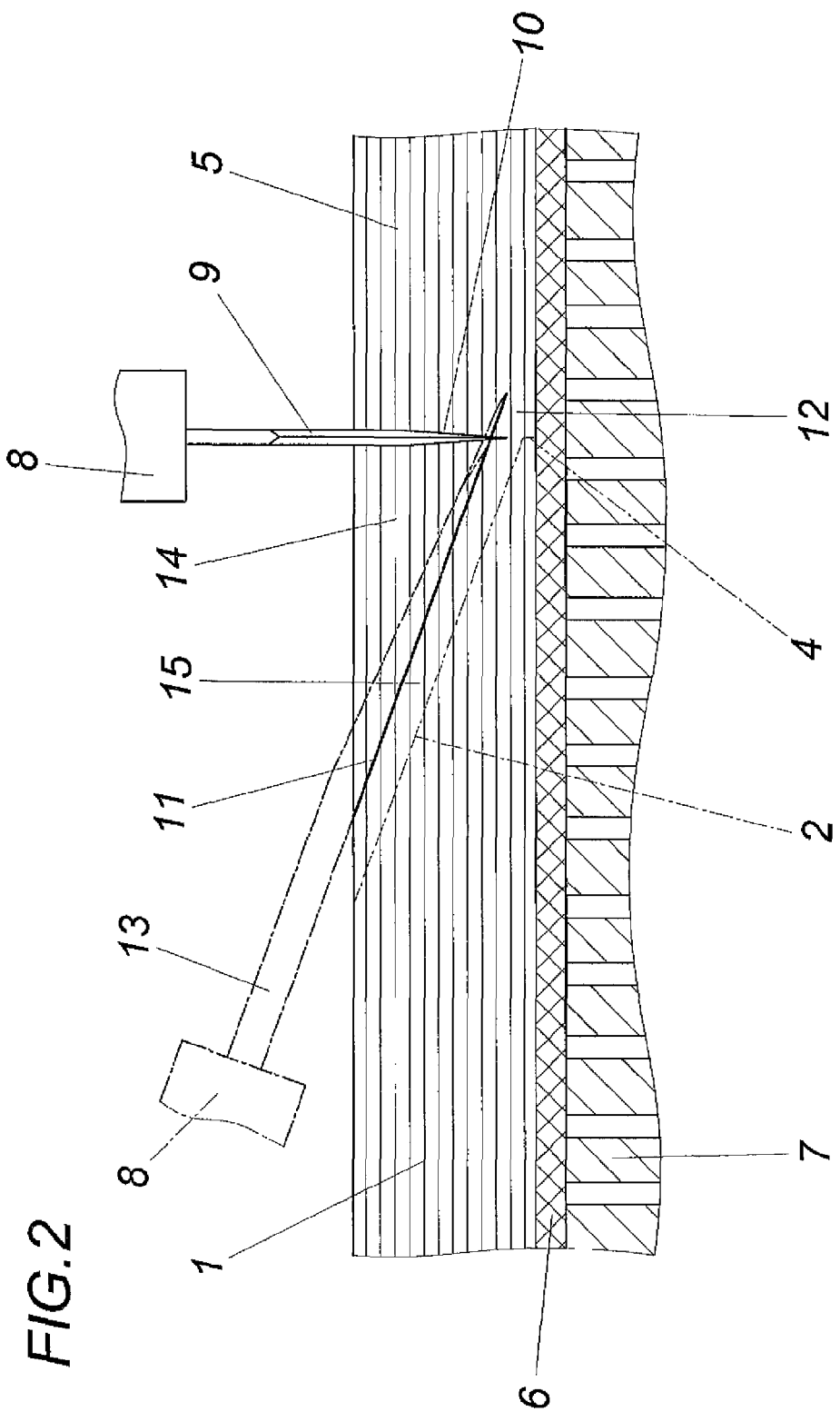

To produce such a blank 1, according to FIG. 2, the fiber layup 5, which is used as the starting material, and is impregnated with plastic but not yet cured, is suctioned onto the cutting support 6 of a cutting table 7, to which partial vacuum can be applied, and thus held fixedly in the correct position for cutting. Cutter heads 8, which are movable along six axes, and are equipped with ultrasound generators for the cutter excitation, are used for cutting this fiber layup 5.

According to the illustrated exemplary embodiment, according to FIG. 2, with the aid of a cutter 9, firstly a preliminary cut 10 is guided transversely to the fiber layup 5 along the intended contour 4, which is indicated by dot-dashed lines, and then a relief cut 11 is guided, which is performed at a distance from the later chamfer 2. The locations of the preliminary cut 10 and the relief cut 11 are selected so that the two cuts 10, 11 intersect outside the cross section of the edge 3 of the blank 1 to be produced and end at a distance above the cutting support 6 in the fiber layup 5. This has the advantage that, between the blank 1 and the remaining fiber layup 5 in the region of the intended contour 4, a fiber bridge 12 remains standing, which also ensures the suctioning correctly for the cut of the fiber layup 5 in the region of the intended contour 4.

The cutter 13 for the relief cut 11 cuts out, in cooperation with the preliminary cut 10, a residual strip 14 from the fiber layup 5, which can be removed, but does not have to be removed, from the fiber layup 5. As a result of the cut guiding of the relief cut 11, a processing allowance 15 remains standing in relation to the intended profile of the chamfer 2, which is only removed by a following chamfer cut 16, as is illustrated in FIG. 3, in which the residual strip 14 cut off by the cuts 10, 11 was removed for reasons of clarity. It may be inferred directly from this illustration that due to the relief cut 11 and the remaining, comparatively thin processing allowance 15, the strain caused by the cutting of the cutter 13 used for the chamfer cut 16 remains restricted, which permits the use of thinner cutters 13. However, it is also possible to use thicker and therefore stiffer cutters, to ensure high cutting precision, because the higher cutter strain in the case of thicker cutters remains restricted due to the thin processing allowance 15 to be cut off. In this context, it is to be considered that heating of the fiber layup 5 during the cutting is to be substantially avoided, to suppress premature curing of the plastic, so that the cutting speed and the friction forces thus arising have a significant influence on the implementation of the cutting surfaces.

Since none of the cuts 10, 11, and 16 completely cut through the fiber layup 5, the holding down of the fiber layup caused by the suctioning is maintained via the fiber bridge 12 for the final cutting of the intended contour 4, which represents an essential condition for a precise contour cut 17 according to FIG. 4. During this contour cut 17, the fiber bridge 12 is cut through along the intended contour 4, wherein the cutter 9 penetrates into the cutting support 6. With this contour cut 17, the processing allowance is also completely cut off from the blank 1, so that the blank is finished with the contour cut 17.

As can be inferred from FIGS. 2 to 4, respectively the same cutter 9 or 13 can be used for the preliminary cut 10 and the contour cut 17, on the one hand, and for the relief cut 11 and the chamfer cut 16, respectively.

The invention claimed is:

1. A method for producing a blank (1) from a fiber layup (5) having an edge (3) forming a chamfer (2), wherein the fiber layup (5), which is suctioned onto a cutting support (6) of a cutting table (7), is cut through using a contour cut (17), which extends into the cutting support (6), along the intended contour (4) of the blank (1) and is provided with the chamfer (2) using a chamfer cut (16) running at a flat chamfer angle (α) along the intended contour (4), wherein the fiber layup (5) is firstly precut by two cuts, which end above the cutting support (6) and run outside the intended cross section of the edge (3), namely a preliminary cut (10) running transversely to the fiber layup (5) along the contour region and a relief cut (11), which determines a processing allowance (15) to the chamfer (2), and then the chamfer (2) is cut using the chamfer cut (16), which ends outside the intended contour (4) in the fiber layup (5), before the intended contour (4) of the blank (1) is produced by the contour cut (17).

2. The method according to claim 1, wherein the preliminary cut (10) is carried out before the relief cut (11).

3. The method according to claim 1, wherein the cut surfaces of the preliminary cut (10) and the relief cut (11) intersect.

4. The method according to claim 2, wherein the fiber layup (5) is divided before the relief cut (11) in the region of the chamfer (2) by a notch, which runs at a distance from the preliminary cut (10), and which ends in the processing allowance (15) determined by the relief cut (11).

5. The method according to claim 1, wherein the preliminary cut (10) is carried out in a surface corresponding to the cut surface of the contour cut (17).

* * * * *